US012774994B2

(12) United States Patent
Moulds et al.

(10) Patent No.: US 12,774,994 B2
(45) Date of Patent: Oct. 27, 2026

(54) METHOD TO REDUCE MEASUREMENT BIAS

(71) Applicant: Micromass UK Limited, Wilmslow (GB)

(72) Inventors: Richard Barrington Moulds, Stockport (GB); David Gordon, Middlewich (GB)

(73) Assignee: Micromass UK Limited, Wilmslow (GB)

( * ) Notice: Subject to any disclaimer, the term of this patent is extended or adjusted under 35 U.S.C. 154(b) by 335 days.

(21) Appl. No.: 18/556,758

(22) PCT Filed: Apr. 22, 2022

(86) PCT No.: PCT/GB2022/051029

§ 371 (c)(1),
(2) Date: Oct. 23, 2023

(87) PCT Pub. No.: WO2022/223989

PCT Pub. Date: Oct. 27, 2022

(65) Prior Publication Data

US 2024/0201149 A1 Jun. 20, 2024

(30) Foreign Application Priority Data

Apr. 23, 2021 (GB) ..................................... 2105778

(51) Int. Cl.
*B01D 15/08* (2006.01)
*G01N 30/72* (2006.01)
(Continued)

(52) U.S. Cl.
CPC ......... *G01N 30/7233* (2013.01); *B01D 15/08* (2013.01); *H01J 49/4215* (2013.01); *G01N 2030/027* (2013.01)

(58) Field of Classification Search
CPC ......... G01N 30/7233; G01N 2030/027; B01D 15/08; H01J 49/4215; H01J 49/0027; H01J 49/0031; H01J 49/0036
See application file for complete search history.

(56) References Cited

U.S. PATENT DOCUMENTS 5,696,376 A * 12/1997 Doroshenko ......... H01J 49/424 250/282
7,820,961 B2 * 10/2010 Hashimoto ......... H01J 49/4225 250/281
(Continued)

FOREIGN PATENT DOCUMENTS

CA 2517700 A1 9/2004
CN 111201586 A 5/2020
(Continued)

OTHER PUBLICATIONS

Search Report for United Kingdom Patent Application No. GB2105778.1, mailed Feb. 3, 2022.
(Continued)

*Primary Examiner* — David J Bolduc
(74) *Attorney, Agent, or Firm* — Goodwin Procter LLP

(57) ABSTRACT

A method of mass analysing a single analytical sample is disclosed comprising: i) transmitting different species of ions through a mass spectrometer; ii) sequentially mass analysing, or otherwise detecting, said different species of ions in a particular sequential order; and then iii) repeating steps i) and ii), wherein the sequential order in which said different species of ions are mass analysed, or otherwise detected, is different when step ii) is repeated. The sensitivity with which the mass spectrometer is able to detect ions varies for a period of time, and step ii) and iii) are performed during that period of time.

20 Claims, 10 Drawing Sheets

(51) Int. Cl.
*H01J 49/42* (2006.01)
*G01N 30/02* (2006.01)

(56) References Cited

U.S. PATENT DOCUMENTS 8,735,087 B2 5/2014 Brands et al.
2002/0063208 A1* 5/2002 Hastings ............. H01J 49/0036 250/281
2004/0041091 A1 3/2004 Bateman et al.
2007/0075239 A1* 4/2007 Ding ..................... H01J 49/424 250/282
2007/0164208 A1* 7/2007 Quarmby .............. H01J 49/427 250/282
2008/0302958 A1* 12/2008 Green ................. H01J 49/4235 250/288
2010/0072362 A1* 3/2010 Giles ................... H01J 49/4295 250/287
2010/0084552 A1* 4/2010 Kawana .............. H01J 49/0077 250/288
2010/0320377 A1* 12/2010 Cotter ................... H01J 49/424 250/283
2011/0101221 A1* 5/2011 Mukaibatake ........ H01J 49/429 250/292
2011/0315866 A1 12/2011 Russell et al.
2012/0109537 A1* 5/2012 Makarov ............. H01J 49/0036 702/27
2012/0158318 A1* 6/2012 Wright ................... G01N 15/02 702/28
2012/0228489 A1 9/2012 Hohndorf et al.
2013/0268212 A1* 10/2013 Makarov ............. H01J 49/0036 702/32
2014/0048701 A1* 2/2014 Green ................... H01J 49/004 250/281
2014/0088923 A1* 3/2014 Wang .................. H01J 49/0036 702/191
2014/0117227 A1* 5/2014 Fujita .................... H01J 49/004 250/286
2014/0142865 A1* 5/2014 Wright ................... G16C 20/20 702/23
2014/0246576 A1* 9/2014 Gilbert ................ H01J 49/0036 250/281
2015/0051843 A1* 2/2015 Wang ..................... G01N 30/00 702/23
2015/0108341 A1 4/2015 Tsukasa et al.
2016/0118235 A1* 4/2016 Fujita .................... H01J 49/022 250/290
2016/0225592 A1* 8/2016 Claus .................. H01J 49/0027
2017/0219540 A1* 8/2017 Anderer ............. B01D 15/1878
2018/0166265 A1* 6/2018 Geromanos ......... H01J 49/0027
2019/0035619 A1* 1/2019 Cooks ................. H01J 49/0027
2019/0108993 A1* 4/2019 Sekiya ................... G01N 27/62
2021/0287897 A1* 9/2021 Lange ................. H01J 49/0009
2021/0313159 A1* 10/2021 Hashimoto ......... H01J 49/0036
2021/0318277 A1* 10/2021 Ikeda ..................... G01N 30/74
2022/0181131 A1* 6/2022 Smith ................. H01J 49/0031
2023/0343569 A1* 10/2023 Bern ...................... G01N 33/58

FOREIGN PATENT DOCUMENTS

EP 2988317 A1 2/2016
JP 2007198882 A 8/2007
JP 2018120804 A 1/2017
WO 2019229954 A1 12/2019
WO 2020031703 A1 2/2020
WO 2022043695 A1 3/2022

OTHER PUBLICATIONS

International Search Report and Written Opinion for International Patent Application No. PCT/GB2022/051029, mailed Aug. 1, 2022.
Search Report for United Kingdom Patent Application No. GB2218649.8, mailed Jul. 14, 2023.

* cited by examiner

| | | | | | |
|---|---|---|---|---|---|
| Time | 0 | 25 | 50 | ms | |
| Sensitivity | 50% | 82% | 93% | | |
| | A | C | I | | |
| | A | C | I | | |
| | A | C | I | | |
| | A | C | I | | |
| | A | C | I | | |
| | A | C | I | | |
| | A | C | I | | |
| | A | C | I | | |
| | A | C | I | | |
| | A | C | I | | |
| | A | C | I | | |
| | A | C | I | | |
| | A | C | I | | |
| | A | C | I | | |
| | A | C | I | Area | Response |
| A | 15 | 0 | 0 | 50% | 54% |
| C | 0 | 15 | 0 | 82% | 88% |
| I | 0 | 0 | 15 | 93% | 100% |

METHOD TO REDUCE MEASUREMENT BIAS

CROSS-REFERENCE TO RELATED APPLICATIONS

This application is a U.S. national phase filing claiming the benefit of and priority to International Patent Application No. PCT/GB2022/051029, filed Apr. 22, 2022, which claims priority from, and the benefit of United Kingdom patent application No. 2105778.1, filed on Apr. 23, 2021. The entire contents of these applications are incorporated herein by reference.

FIELD OF THE INVENTION

The present invention relates generally to mass spectrometers and in particular to mass spectrometers that are controlled in a way that may cause a variation in the sensitivity with which the spectrometer is able to detect ions.

BACKGROUND

Mass and/or ion mobility spectrometers include various electrodes that are used to manipulate ions, such as ion optics. Voltages are applied to these electrodes so as to maintain them at the electrical potentials required for their use. In general, positive ions are repelled from electrodes that are maintained at a positive electric potential, whereas these ions are attracted to electrodes maintained at a negative potential. Similarly, negative ions are generally repelled from electrodes that are maintained at a negative potential, whereas they are attracted to electrodes maintained at a positive potential.

Since electrodes are electrically conductive and connected to a voltage supply, any ions hitting the electrodes will be neutralised and the charge of the ions returned to the voltage supply. The potential on the electrode will be held at the potential of the voltage supply, no matter what ion current impinges upon it.

However, over time, at least some of the electrodes may become contaminated by the samples being analysed by the spectrometer. For example, the analyte, the matrix in which the analyte is provided, or any other additives in the sample may build up on various electrodes of the spectrometer. If this contamination is not electrically conductive then it may form an electrically insulating layer on parts of the electrodes. Any ions hitting these insulating surfaces will not then be electrically discharged and hence a voltage due to the charge of the ions will build up on the insulating layer. Ions passing close to the insulating surface will then be affected by the voltage of the ions on the insulating surface, hence affecting their passage through the mass spectrometer. This may affect the efficiency with which ions are guided to the analyser of the mass spectrometer, and thus may affect the sensitivity of the spectrometer.

Ions on the insulating layer may eventually migrate off the insulating layer so as to directly impact the electrode and thus be discharged. Therefore, the voltage due to ions located on the insulating layer may vary based on the ion current impacting the insulating layer, the capacitance formed by the insulating layer and the rate at which ions leave the insulating layer.

Certain events can cause relatively large ion currents to be directed towards or onto the electrodes. For example, if the electrodes in an ion guiding region are maintained at voltages so as to guide positive ions therethrough, but then the voltages are changed for guiding negative ions, any positive ions remaining in the ion guiding region may hit the electrodes. If one or more electrode of the ion guide is contaminated with an electrically insulating layer then this sudden increase in ion current impinging on the insulating layer may lead to a temporary change in instrument sensitivity (i.e. the efficiency with which ions are transmitted through the spectrometer). The change in sensitivity may then gradually recover to, or towards, its previous value as ions migrate off the insulating layer.

The above described contamination can cause problems with analysing analytes. For example, the above-described changes in sensitivity of the spectrometer can cause problems with quantitation analysis of analytes. For example, conventional approaches to quantitation of an analyte involve the sequential analysis of the analyte and an internal standard, but the above described time-varying change in sensitivity of the spectrometer may affect the analysis of the analyte and internal standard differently. This results in a measurement bias, which may not be well mitigated for, e.g. by use of a calibration curve. Where quality control analysis is being performed, this problem may result in erroneous quality control failures.

SUMMARY

The present invention provides a method of mass analysing a single analytical sample comprising: i) transmitting different species of ions through a mass spectrometer; ii) sequentially mass analysing, or otherwise detecting, said different species of ions in a particular sequential order; and then iii) repeating steps i) and ii), wherein the sequential order in which said different species of ions are mass analysed, or otherwise detected, is different when step ii) is repeated.

The present invention recognises that the sensitivity with which the spectrometer is able to detect ions may temporarily vary for a period of time whilst analysing the analytical sample. This variation in sensitivity may be caused by varying the operation of the spectrometer, e.g. by switching an operational parameter thereof. For example, changing the amplitude or polarity of the voltage applied to one or more electrodes may cause this variation in sensitivity. Alternatively, or additionally, a variation in sensitivity of the spectrometer may be caused by a change in another variable, such as being caused by the components of the sample being analysed varying with time. For example, the sample may be separated by chromatography and ionised prior to analysis, and a relatively highly concentrated component may elute from the separation device and be ionised so as to produce a relatively intense ion signal. This intense ion signal may cause the sensitivity of the spectrometer to vary with time, e.g. by the intense ions causing surface charging of electrodes within the spectrometer or by another effect that changes sensitivity.

It is known to analyse different species of ions in sequence and then repeat this sequence of analysis. However, if said different species of ions are sequentially transmitted through the spectrometer in the same order each time, during each period in which the sensitivity of the spectrometer varies, then any given one of these different species of ions will experience substantially the same level of the time-varying sensitivity every time it is analysed. This is problematic, for example, for the comparison of the ion signals for the different species of ions. Embodiments of the present invention enable the sensitivity of the spectrometer to vary on multiple different occasions, but in contrast to known techniques, the order in which the different species of ions are sequentially transmitted is varied so as to be different for said multiple different occasions. This ensures that each of the different species of ions is subjected to multiple different levels of the time-varying sensitivity, thereby mitigating the above problem.

The sensitivity with which the mass spectrometer is able to detect ions may vary for a period of time, and step ii) and iii) may be performed during said period of time.

The method may comprise varying the operation of the mass spectrometer in a manner that causes the sensitivity with which the spectrometer is able to detect ions to vary for said period of time.

Said step of varying the operation of a mass spectrometer may correspond to varying the operational parameter of the mass spectrometer so as to control the mass spectrometer to operate differently. The step of varying the operation of the mass spectrometer may comprise switching the operational parameter between different, discrete values, thus causing the sensitivity with which the spectrometer is able to detect ions to vary for said period of time (after each switch).

Accordingly, said step of varying the operation of the mass spectrometer may comprise switching the voltage applied to at least one electrode of the mass spectrometer that controls the transmission of ions therethrough to a different voltage; and step i) may comprise subsequently transmitting said different species of ions through the spectrometer and passed said at least one of said electrodes.

Said step of varying the operation of the mass spectrometer may comprise switching the polarity of the voltage to a different polarity.

For example, the at least one electrode may be maintained at a first polarity (e.g. positive) in order to transmit ions of the opposite polarity (e.g. negative) through the mass spectrometer, and the step of varying the operation of the mass spectrometer may comprise switching the polarity of that at least one electrode to a second, opposite polarity (e.g. negative) in order to transmit ions of the opposite polarity (e.g. positive) through the mass spectrometer. Steps i) and ii) may then be performed so as to analyse the different species of ions. The method may then comprise switching the at least one electrode back to the first polarity, e.g. in order to analyse different species of ions. The method may then be repeated by switching back to the at least one electrode back to the second polarity etc.

The step of varying the operation of the mass spectrometer may comprise alternating the mass spectrometer between a first mode of operation in which it generates and transmits positive ions and a second mode of operation in which it generates and transmits negative ions, and/or vice versa.

Each time step ii) is performed, it may comprise mass filtering said different species of ions using a mass filter such that only a single species of ion is transmitted to an ion detector at any one time, and the mass filter may be controlled so as to change the species of ion that is transmitted to the detector at different times, thereby defining said sequential order in which the different species of ions are mass analysed.

A first time that step ii) is performed, the mass filter may transmit only a first of said different species of ions to the detector at a first time, and subsequently may transmit only a second of the different species of ions to the detector at a second, subsequent time. A subsequent time that step ii) is performed, the mass filter may transmit only the second of said different species of ions to the detector at one time, and may subsequently transmit only the first of the different species of ions to the detector at a later time.

It will be appreciated that the invention is not limited to transmitting only two species of ions at two respective times, each time step ii) is performed, but that further species of ions might also be transmitted at further respective times. For example, each time step ii) is performed, the mass filter may also transmit only a third species of ion at a third time and optionally may also transmit a fourth (or further) species of ion at a fourth (or further) time.

For example, the first ions may be ions of (or derived from) an analyte of interest. The second ions may be ions of (or derived from) an internal standard for the analyte of interest. The third ions may be confirmatory ions for confirming the analyte of interest is present. The fourth ions may be secondary confirmatory ions for confirming the analyte of interest is present.

Step iii) may comprise performing an analytical sequence that consists of repeating steps i) and ii) a plurality of times, wherein the sequential order in which said different species of ions are mass analysed, or otherwise detected, during these plurality of times is different each and every time step ii) is performed within the analytical sequence.

The method may comprise performing said analytical sequence multiple times, such as an integer number of times.

The method may comprise comparing the ion signal detected for one of said different species of ions with the ion signal detected for another of said different species of ions.

For example, said different species of ions may comprise ions of, or derived from, an analyte of interest and also ions of, or derived from, an internal standard. The ion signal for the ions of, or derived from, the analyte of interest may be compared to the ion signal for ions of, or derived from, the internal standard, e.g. in order to quantify the ions of, or derived from, the analyte of interest.

The user may input into the mass spectrometer the species of ions that are said different species of ions, so that the user selects the species of ions that are analysed in different sequential orders in step iii) (of claim 1). The species of ions may be input into the spectrometer by inputting their mass to charge ratios.

Accordingly, the spectrometer may comprise a user interface and, prior to step ii), the method may comprise selecting the species of ions that are to be said different species of ions and inputting these selected species of ions into the user interface so that the mass spectrometer performs steps ii) and iii) on these ions.

Optionally, only the species of ions that are input into the user interface are mass analysed or otherwise detected during steps ii) and iii).

The species of ions that are input into the spectrometer as said different species of ions are preferably species of ions whose intensities are directly related to each other (at a constant spectrometer sensitivity).

All of the steps described above, or elsewhere herein, may be performed within a single experimental run. In other words, the method described herein may be performed whilst analysing a single analytical sample (rather than analysing different analytical samples in different experiments, or analysing different replicates of an analytical sample in different experiments). For example, the method described herein may be performed during the continuous introduction of an analytical sample into the mass spectrometer (e.g. during the continuous elution of a sample from a liquid chromatography device).

The method may comprise fragmenting or reacting ions of an analyte of interest, and optionally ions of a corresponding internal standard, so as to form fragment or product ions; wherein said different species of ions comprise multiple different ones of the fragment or product ions.

For the avoidance of doubt, the step of reacting ions comprises reacting the ions with another species of ion or molecule so as to form product ions that are different from the ions being reacted.

Said different species of ions that are sequentially analysed may comprise a first fragment or product ion of the analyte of interest, a second fragment or product ion of the analyte of interest, and a fragment or product ion of the internal standard.

It may be desirable to analyse multiple different analytes of interest in the sample.

The method may comprise separating a sample that comprises a plurality of different analytes of interest using a chromatography device such that said different analytes of interest elute from the chromatography device over different respective time periods, and ionising the sample eluting from the chromatography device so as to provide ions of said analytes of interest. Optionally, the sample also comprises an internal standard corresponding to one or more of said different analytes of interest, wherein each internal standard elutes from the chromatography device over substantially the same time period as its respective analyte of interest and is then ionised.

For example, the chromatography device may be a liquid chromatography device or a gas chromatography device.

Steps i) to iii) may be performed during each time period that each analyte of interest is expected to elute from the chromatograph device.

Where multiple different analytes of interest elute from the chromatography device over time periods that partially overlap with each other, performing steps i) to iii) may comprise: a) performing the method of analysis so as to trigger a period of time in which the sensitivity with which the mass spectrometer is able to detect ions varies; and then b) fragmenting or reacting ions of a first analyte of interest, and optionally ions of a corresponding internal standard, so as to form fragment or product ions, and sequentially mass analysing or otherwise detecting these fragment or product ions; and then c) performing the method of analysis so as to trigger a period of time in which the sensitivity with which the mass spectrometer is able to detect ions varies; and then d) fragmenting or reacting ions of a second analyte of interest that elutes from the chromatography device over a time period that partially overlaps with that of the first analyte of interest, and optionally also fragmenting or reacting ions of a corresponding internal standard, so as to form different fragment or product ions, and sequentially mass analysing or otherwise detecting these fragment or product ions; and e) repeating steps a) to d) during the period that the first and second analytes of interest co-elute from the chromatography device.

The method may comprise isolating each analyte of interest (or its respective internal standard) before fragmenting or reacting it. This may be performed by using a further mass filter arranged between the ion source and fragmentation or reaction region so as to transmit only a single analyte of interest (or internal standard) at a time. The method may therefore use a tandem quadrupole (or triple quadrupole) mass spectrometer.

The method may comprise performing steps i) to iii) over the period that an analyte of interest elutes from the chromatography device so as to obtain the intensity of the ion signal detected for one of said different species of ions for each time that the steps are repeated; producing a first set of data that comprises the intensity of the ion signal as a function of detection time; smoothing the first set of data so as to obtain a second set of smoothed data; and determining if maintenance of the spectrometer is required based on a comparison of the first and second sets of data.

Each of the first and second sets of data represent an ion signal peak for said one of the different species of ions. The step of comparing the first and second sets of data may comprise comparing the profiles of the peaks represented by the first and second sets of data. If these differ then it may indicate that the electrodes of the spectrometer may have become contaminated, for example.

The method may comprise controlling a display screen to indicate that maintenance of the spectrometer is required if the first and second sets of data do not match or differ by a predetermined or threshold amount.

Step iii) may comprise repeating step ii) in a manner such that the first species of ion mass analysed, or otherwise detected, any given time that step ii) is performed differs from the last species of ion that was mass analysed, or otherwise detected, the preceding time that step ii) was performed.

This helps to reduce the jitter of the ion signal.

The present invention also provides a mass spectrometer comprising: a mass analyser; and a controller having electronic circuitry configured to control the spectrometer to: i) transmit different species of ions through the mass spectrometer; ii) sequentially mass analyse, or otherwise detect, said different species of ions in a particular sequential order; and then iii) repeat steps i) and ii), wherein the sequential order in which said different species of ions are mass analysed, or otherwise detected, is different when step ii) is repeated.

The spectrometer is configured to perform these steps whilst analysing a single analytical sample, i.e. during a single experimental run.

The spectrometer may be configured to perform any of the methods described herein.

For example, the mass spectrometer may comprise a user interface for inputting the species of ions that are to be said different species of ions into the mass spectrometer, and the mass spectrometer may be configured to perform steps ii) and iii) on these inputted species of ions.

The concept described above of detecting whether or not maintenance is required is new in its own right.

Accordingly, the present invention also provides a method of mass spectrometry comprising: i) operating a mass spectrometer during a period of time in which the sensitivity with which the mass spectrometer is able to detect ions varies; ii) using the mass spectrometer to determine the intensity of the ion signal of an ion of interest within said period of time; iii) repeating steps i) and ii) as the ion of interest, or an analyte from which it is derived, elutes from a separation device; wherein when step ii) is repeated, it is performed at different times after said period of time begins; iv) producing a first set of data that comprises the intensity of the ion signal as a function of detection time; v) smoothing the first set of data so as to obtain a second set of smoothed data; and vi) determining if maintenance of the spectrometer is required based on a comparison of the first and second sets of data.

For example, the method may determine that maintenance is required if the first and second sets of data do not match or differ by a predetermined or threshold amount.

The method may further comprise controlling a display screen to indicate that maintenance of the spectrometer is required, e.g. if the first and second sets of data do not match or differ by a predetermined or threshold amount.

The present invention also provides a mass spectrometer comprising: a separation device for separating ions, or analytes; a mass analyser; and a controller having electronic circuitry configured to control the mass spectrometer to: i) operate during a period of time in which the sensitivity with which the mass analyser is able to detect ions varies; ii) determine the intensity of the ion signal of an ion of interest detected by the mass analyser within said period of time; iii) repeat steps i) and ii) as the ion of interest, or an analyte from which it is derived, elutes from the separation device; wherein when step ii) is repeated, it is performed at different times after said period of time begins; iv) produce a first set of data that comprises the intensity of the ion signal as a function of detection time; v) smooth the first set of data so as to obtain a second set of smoothed data; and vi) determine if maintenance of the spectrometer is required based on a comparison of the first and second sets of data.

The spectrometer may have a display screen and electrical circuitry that controls the display screen based on the above comparison in order to display when maintenance of the spectrometer is required.

BRIEF DESCRIPTION OF THE DRAWINGS

Various embodiments of the present invention will now be described, by way of example only, and with reference to the accompanying drawings in which.

DETAILED DESCRIPTION

Figure 1:
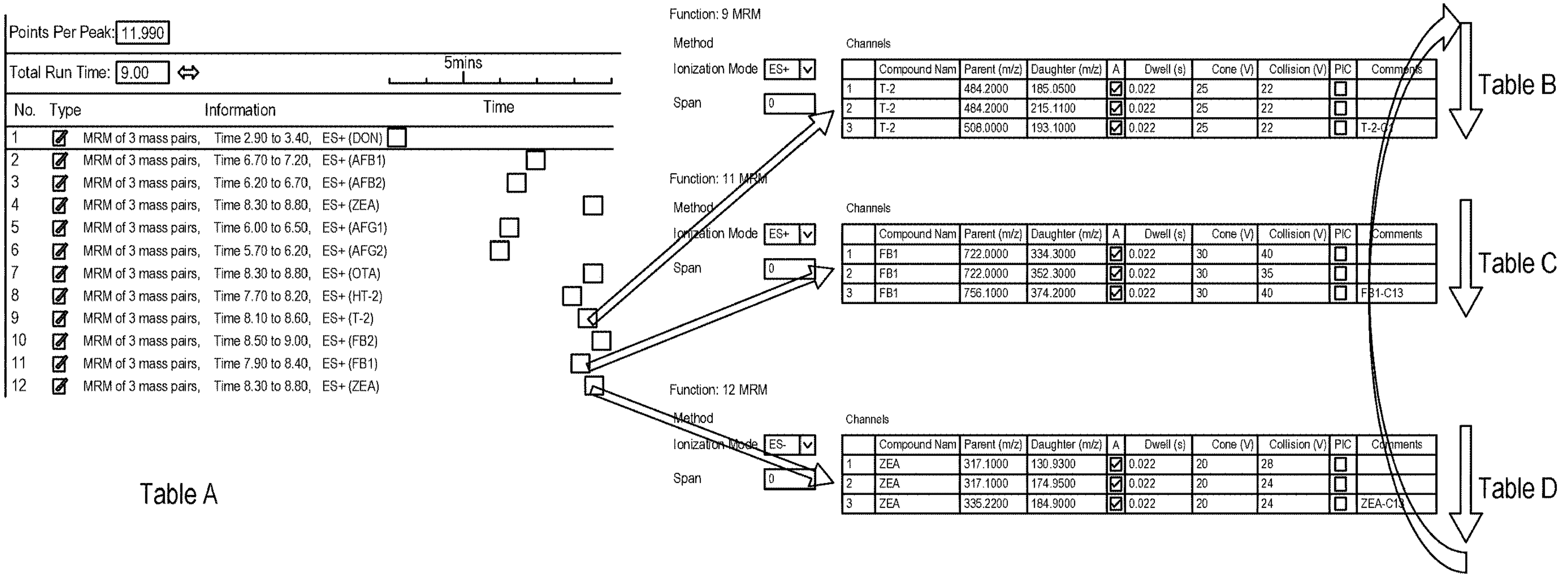
FIG. 1 shows data from a method of Multiple Reaction Monitoring using a tandem mass spectrometer.

Conventional approaches for quantifying an analyte use both the ion signal for the analyte and also the ion signal from an internal standard. Internal standards are required as different instruments may have different sensitivities, or even the same instrument may have different sensitivities at different times, e.g. due to different set-ups or drift. The use of an internal standard enables the response of the instrument to be calibrated for an analyte.

Best practice dictates that for the quantification of any given analyte, a corresponding internal standard is used that has very similar chemical properties to the analyte but a different mass to charge ratio value. For example, the internal standard may be an analogue of the analyte which is the same as the analyte except that some atoms have been replaced by atoms of the same element but a different isotope. For example, hydrogen atoms of the analyte may be replaced by deuterium atoms when forming the internal standard. In this example the analogue would have substantially the same chemical properties as the analyte, but would be N neutrons heavier, where N is the number of hydrogen atoms replaced by deuterium atoms.

In order to assist in the understanding of the present invention, an example of a conventional quantitation analysis will now be described. During sample preparation a fixed amount of one or more internal standards is introduced into the sample for one or more respective analytes of interest. The sample is then injected into a liquid chromatography mass spectrometer (LCMS) system. The liquid chromatography then separates (in time) the analyte(s) of interest from other components in the sample. However, as internal standards typically have substantially the same chemical properties as their corresponding analytes, an internal standard typically co-elutes with its respective analyte. The components eluting from the chromatography device are then ionised. The mass spectrometer filters ions such that only ions of a selected mass to charge ratio are transmitted to the detector at any given time. The detector detects the ion current for the transmitted ions. The spectrometer may be set so as to only transmit ions having a mass to charge ratio corresponding to a first analyte of interest to the detector, such that the ion current of the first analyte is detected. The spectrometer may then be set so as to only transmit ions having a mass to charge ratio corresponding to a first internal standard for the first analyte of interest, such that the ion current of the first internal standard is detected.

The above-described processes of analysing the first analyte of interest and the first internal standard may be repeated within the period of time that the first analyte and first internal standard are expected to elute from the chromatographic device (e.g. at the expected elution time, plus or minus a tolerance time). If more than one analyte of interest is to be quantified, then the above process may be repeated for each analyte of interest that elutes and its corresponding internal standard.

A tandem mass spectrometer may be used to perform the above method.

During the above process, the ion current detected at the detector is determined as a function of time. This data is used to determine the presence of any chromatographic peaks for the ions from the analytes of interest and their internal standards. The area of the chromatographic peak for ions from each analyte of interest is determined and the area of the chromatographic peak for the ions from their corresponding internal standard is determined. The ratio of the analyte peak area to the peak area of its corresponding internal standard is then determined. This quantity is referred to hereon as the Analyte Response. The amount of any given analyte can then be determined by a calculation that includes multiplying the Analyte Response by the amount of its corresponding internal standard that was added during the sample preparation. This ratiometric method is intended to ensure that changes in instrument sensitivity have little effect on the sample quantitation reported by the assay.

As well as using an internal standard, it may also be desired to detect one or more species of confirmatory ion. This is used to confirm that the correct analyte of interest is being analysed. Suitable confirmatory ions may, for example, be one or more species of fragment ion of the analyte of interest.

Conventionally, the mass spectrometer is set to automatically analyse an analyte of interest, its internal standard, and its confirmatory ion. This set of analyses may be repeated, but the spectrometer is configured such that each time the set of analyses is repeated the order in which the analyte of interest, its internal standard, and its confirmatory ion are analysed is the same. An example of this will now be described with reference to FIG. 1.

FIG. 1 shows data from a method of Multiple Reaction Monitoring (MRM) using a tandem mass spectrometer. In such a method, the analytical sample is separated by a liquid chromatography device and the eluting sample is ionised. The resulting ions are transmitted to a first mass filter, which is set so as to be capable of only transmitting ions having a certain mass to charge ratio. The first mass filter is set so as to only transmit parent ions having a mass to charge ratio corresponding to that of an ion of interest. The parent ions transmitted by the first mass filter are then fragmented and the resulting fragment ions are transmitted to a second mass filter. The second mass filter is set so as to be capable of only transmitting fragment ions having a certain mass to charge ratio, which corresponds to a fragment ion of interest. Ions that are transmitted by the second mass filter are detected by an ion detector, which measures the ion current due to those ions. The mass to charge ratios that the first and second mass filters are set to transmit is changed with time, so as to monitor for different ions of interest.

More specifically, FIG. 1 illustrates an example in which 12 different analytes of interest are to analysed by Multiple Reaction Monitoring (MRM). This is represented by the 12 rows in Table A on the left side of FIG. 1. Each row shows the time at which the respective analyte of interest elutes from the liquid chromatography device, both numerically and also by the locations of the boxes relative to the time scale. Each row also shows the polarity of the ion source when generating those ions, where ES+ is a positive electrospray mode and ES− is a negative electrospray mode.

The right side of FIG. 1 illustrates how the MRM analysis is performed for three of the analytes of interest that have overlapping elution times. Table B illustrates the analysis of a first analyte of interest. As shown in this table, the mass spectrometer is operated in a positive (electrospray) ion mode so as to generate positive parent ions. The first row in Table B indicates that the first mass filter of the tandem mass spectrometer filters the parent ions so as to transmit only parent ions having a mass to charge ratio (m/z) of 484. The parent ions transmitted by the first mass filter are then fragmented and transmitted to a second mass filter that is set so as to transmit only fragment ions having m/z=185. These fragment ions are detected by a detector and the resulting ion current determined. As shown in the second row of Table B, the mass spectrometer then switches the second mass filter so as to transmit only fragment ions having a m/z=215. This corresponds to the mass to charge ratio of fragment ions that would be expected to be present if the analyte being analysed is truly the first analyte of interest. In other words, this corresponds to the mass to charge ratio of confirmatory ions for the first analyte of interest. As shown in the third row of Table B, the mass spectrometer then switches the first mass filter so as to transmit only parent ions having m/z=508, which corresponds to the mass to charge ratio that ions of the internal standard for the first analyte of interest have. The parent ions transmitted by the first mass filter are then fragmented and transmitted to the second mass filter. The second mass filter is set so as to transmit only fragment ions having m/z=198 (which may be the analogue of the fragment ion having m/z=185). These fragment ions are detected by the detector and the resulting ion current determined.

The mass spectrometer is repeatedly cycled between the three modes of analysing each ion of interest, its confirmatory ion and its internal standard during at least some of the period that the ion of interest is expected to elute from the chromatography device. However, when multiple analytes of interest may elute from the chromatography device with elution times that overlap then it is also necessary to analyse the other analytes of interest in a corresponding manner to that described above in an interleaved manner. An example of this is shown in Tables C and D.

Table C illustrates the analysis of a second analyte of interest that elutes from the chromatograph device over a time period that overlaps with the elution time of the first analyte of interest. As shown in Table C, the mass spectrometer is operated in a positive (electrospray) ion mode so as to generate positive parent ions. The first row in Table C indicates that the first mass filter of the tandem mass spectrometer filters the parent ions so as to transmit only parent ions having a mass to charge ratio (m/z) of 722. The parent ions transmitted by the first mass filter are then fragmented and transmitted to a second mass filter that is set so as to transmit only fragment ions having m/z=334. These fragment ions are detected by a detector and the resulting ion current determined. As shown in the second row of Table C, the mass spectrometer then switches the second mass filter so as to transmit only fragment ions having a m/z=352. This corresponds to the mass to charge ratio of confirmatory ions for the second analyte of interest. As shown in the third row of Table C, the mass spectrometer then switches the first mass filter so as to transmit only parent ions having m/z=756, which corresponds to the mass to charge ratio that ions of the internal standard for the second analyte of interest have. The parent ions transmitted by the first mass filter are then fragmented and transmitted to the second mass filter. The second mass filter is set so as to transmit only fragment ions having m/z=374 (which may be the analogue of the fragment ion having m/z=334). These fragment ions are detected by the detector and the resulting ion current determined.

Similarly, Table D illustrates the analysis of a third analyte of interest that elutes from the chromatograph device over a time period that overlaps with the elution time of the first and second analytes of interest. As shown in Table D, the mass spectrometer is operated in a negative electrospray ion mode (because these molecules are more efficiently ionised in negative mode) so as to generate negative parent ions. The first row in Table D indicates that the first mass filter of the tandem mass spectrometer filters the parent ions so as to transmit only parent ions having a mass to charge ratio (m/z) of 317. The parent ions transmitted by the first mass filter are then fragmented and transmitted to a second mass filter that is set so as to transmit only fragment ions having m/z=131. These fragment ions are detected by a detector and the resulting ion current determined. As shown in the second row of Table D, the mass spectrometer then switches the second mass filter so as to transmit only fragment ions having a m/z=175. This corresponds to the mass to charge ratio of confirmatory ions for the third analyte of interest. As shown in the third row of Table D, the mass spectrometer then switches the first mass filter so as to transmit only parent ions having m/z=335, which corresponds to the mass to charge ratio that ions of the internal standard for the third analyte of interest have. The parent ions transmitted by the first mass filter are then fragmented and transmitted to the second mass filter. The second mass filter is set so as to transmit only fragment ions having m/z=185 (which may be the analogue of the fragment ion having m/z=130). These fragment ions are detected by the detector and the resulting ion current determined.

As described above, if multiple different analytes of interest elute from the chromatography device during overlapping time periods, then the mass spectrometer repeatedly cycles through analysing the different analytes of interest during the period that they co-elute. In the example shown in FIG. 1, after the spectrometer has operated as shown in Table D, it proceeds by cycling back to operating as shown in Table B, and then to operate as shown in Table C and then to operate as shown in Table D. This cycling may be repeated multiple further times for the period that the first, second and third analytes of interest co-elute. This is illustrated by the arrows on the right side of FIG. 1.

If different analyte ions of interest have different polarities, then when the mass spectrometer switches between analysing those ions it will switch the polarity of voltages applied to certain ones of its electrodes. In the example of FIG. 1, this occurs when the spectrometer switches between analysing the second and third analytes of interest and when the spectrometer switches between analysing the third and first analytes of interest. For the reasons described in the Background section above, the sensitivity of the spectrometer may vary with time after switching the polarity of the spectrometer. For example, the sensitivity of the instrument may change on switching polarity and then may progressively recover back to the sensitivity that it was at prior to the polarity switch, as ions migrate from the contaminated area.

Figures 2, 3:
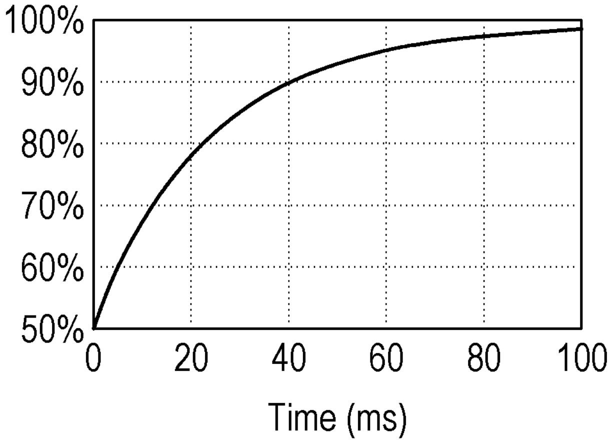
FIG. 2 shows an example of how the sensitivity of a mass spectrometer may vary with time.
FIG. 3 illustrates the effect that the time varying sensitivity has on the detection of various ions when they are analysed in the same order each time.

FIG. 2 shows an example of how the sensitivity of the mass spectrometer may vary with time from the point at which the mass spectrometer has switched so to generate and transmit ions of a different polarity. As can be seen, the sensitivity may be instantly reduced to a relatively low value, e.g. 50% of the sensitivity prior to the polarity switch. The sensitivity then gradually recovers over time to being at the same value it was prior to the polarity switch (i.e. 100%).

FIG. 3 illustrates the effect that the time varying sensitivity has on the detection of the fragment ions (A) of the analyte of interest, the confirmatory ions (C), and fragment ions (I) of the internal standard. In the example shown the spectrometer is configured to switch the mass filters so as to cycle between analysing ions A, C and I at 0 ms, 25 ms and 50 ms, respectively, after the spectrometer has changed polarity. Referring back to FIG. 2, it can be seen that at these analysis times, ion A will be analysed with 50% sensitivity, ion C will be analysed with 82% sensitivity, and ion I will be analysed with 93% sensitivity. FIG. 3 depicts 15 such cycles being performed. The areas of the ion signals detected for ions A, C and I will therefore be 50%, 82% and 93%, respectively, of the ion signal actually being transmitted into the spectrometer.

As described previously, the ratio of the area of the ion signal derived from the analyte of interest to the area of the ion signal derived from the internal standard is used to quantify the amount of analyte of interest present in the sample. This ratio is known as the Analyte Response and is shown in FIG. 3 as being 54% (i.e. =50/93). Similarly, the Response for the confirmatory ions C is given by the ratio of the area of the ion signal for the confirmatory ions to the area of the signal derived from the internal standard, which is shown in FIG. 3 as being 88% (i.e. =82/93). The Response for the internal standard I is obviously 100% (i.e. 93/93). It is clear from FIG. 3 that the time varying sensitivity of the spectrometer leads to different levels of relative sensitivity for the analyte of interest A, its confirmatory ions C and its internal standard I, which is problematic.

Figure 4:
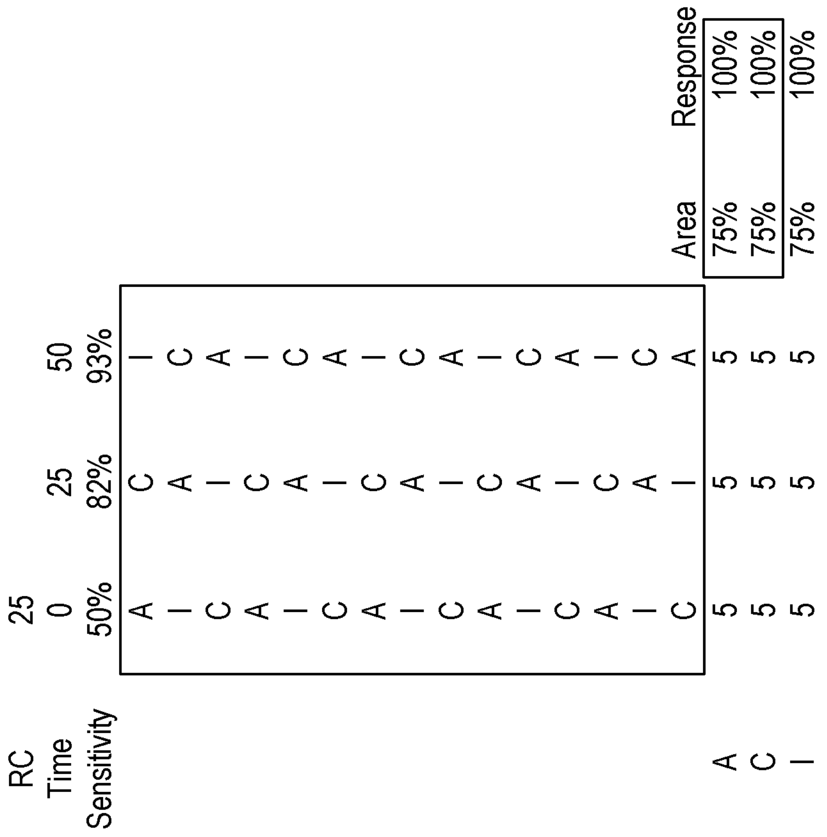
FIG. 4 illustrates the effect that the time varying sensitivity has on the detection of various ions when they are analysed in accordance with an embodiment of the present invention.

FIG. 4 illustrates an example according to an embodiment of the present invention, which is the same as that described above except that instead of analysing ions A, C and I in the same order after each polarity switch (as shown in FIG. 3), the order in which ions A, C and I are analysed differs after different polarity switches.

In the embodiment of FIG. 4, the spectrometer initially analyses ions A, then switches to analysing ions C, then switches to analysing ions I. After the first polarity change, the spectrometer initially analyses ions I, then switches to analysing ions A, then switches to analysing ions C. After the second polarity change, the spectrometer initially analyses ions C, then switches to analysing ions I, then switches to analysing ions A. The above process is represented in the first three rows in FIG. 4. The method then cycles back and repeats these three routines, as illustrated by the fourth to sixth rows in FIG. 4. The method then cycles back and repeats the three routines again, as illustrated by the seventh to ninth rows in FIG. 4. The method then cycles back and repeats the three routines again, as illustrated by the tenth to twelfth rows in FIG. 4. The method then cycles back and repeats the three routines again, as illustrated by the thirteenth to fifteenth rows in FIG. 4.

Analysing ions A, C and I in different orders after different polarity switches (i.e. analysing each type of ion at different times after different polarity switches) results in the sensitivity with which each of the ions is analysed with being varied, such that each type of ion is analysed with relatively high and low sensitivities. In the example shown in FIG. 4, each of ions A, C and I is analysed 15 times in total, i.e. 5 times at 50% sensitivity, 5 times at 82% sensitivity and 5 times at 93% sensitivity. The peak area of each is therefore 75%, i.e. $\frac{1}{15}$*(5×50+5×82+5×93). The Analyte Response shown in FIG. 4 is therefore 100% (i.e. =75/75). Similarly, the Response for the confirmatory ions C is also 100% (and the Response for the internal standard I is obviously 100%).

For illustrative purposes it has been assumed that analyte A and its internal standard I co-elute with a perfectly square profile and that the ion currents for the ions A. C and I are all identical. The tables shown in the Figures only show the resultant readings by the spectrometer during the period that analyte A elutes.

Figure 5:
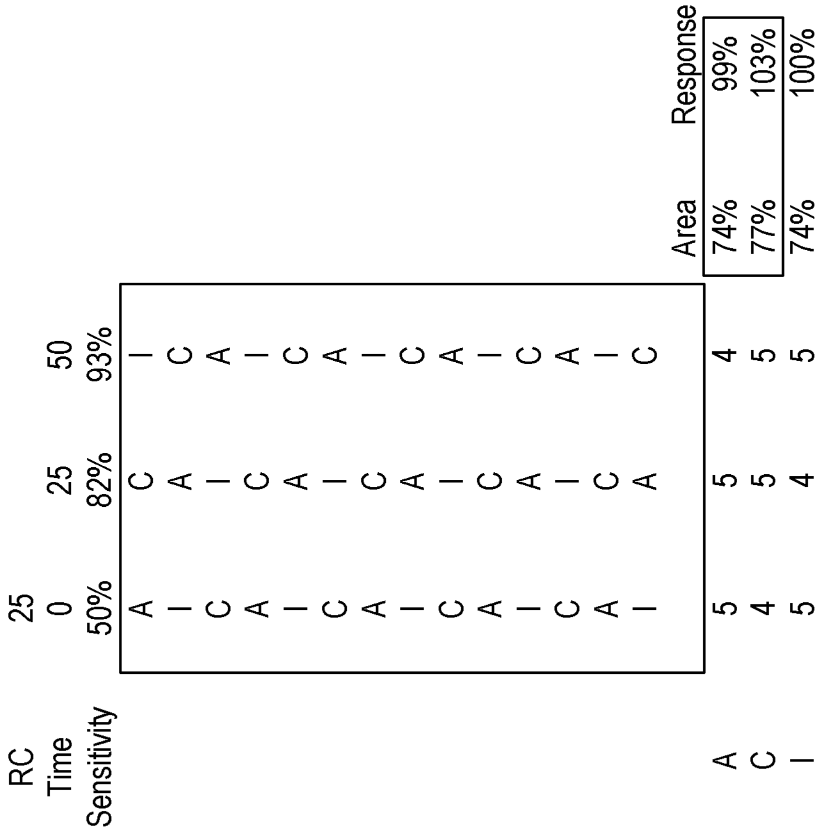
FIG. 5 illustrates an embodiment that is the same as FIG. 4, except that the ions are analysed a different number of times.

FIG. 5 shows an embodiment that is the same as that of FIG. 4, except that it is assumed that analyte A elutes over a shorter time period than in FIG. 4 and so ions C, I and A represented in the last row in FIG. 4 are not detected. Accordingly, in FIG. 5, the peak areas for ions A, C and I are different to each other and the Responses for ions A, C and I are different to each other. However, it can be seen from FIG. 5 that even if ions A, C and I are analysed a different number of times at a given sensitivity, by varying the order in which ions A, C and I are analysed, the peak areas for ions A, C and I are only slightly different to each other and the Responses for ions A, C and I are only slightly different to each other. This is quite different to the conventional technique of FIG. 3, in which the order of analysis is not varied and the peak areas for ions A, C and I are very different to each other and the Responses for ions A, C and I are very different to each other.

If desired, the method of FIG. 5 may be adapted so as to operate as shown in FIG. 4 by setting (e.g. varying) the dwell times of the mass filters such that ions A, C and I are analysed by the spectrometer for the same total duration during the expected chromatographic peak width of the analyte of interest.

It is good laboratory practice to sample any given chromatographic peak enough times during that peak to allow accurate reconstruction of the peak shape. The examples given in relation to FIGS. 3 and 4 sample the ion signal 15 times for each of ions A, C and I during their respective elution peak. However, the invention is not limited to 15 samples and other numbers of samples per peak may be used. If any given ion is analysed different numbers of times for the different spectrometer sensitivities, then the negative effect of this is reduced the greater the number of times the ion is sampled.

The spectrometer can analyse the data obtained for an ion peak and usefully infer from this data the level of contamination on the electrodes of the spectrometer. For example, the spectrometer may sample the ion signal a plurality of times over the peak so as to obtain a first set of data and may then smooth that data so as to obtain a second set of (smoothed) data. The spectrometer may compare the two sets of data to determine the level of contamination on the electrodes. This may be done, for example, by the spectrometer taking each point in the peak and summing the squares of the difference between the smoothed and unsmoothed versions so as to provide an indication of the level of instability of the peak. Alternatively, the mean value may be subtracted prior to squaring. For example, the data points, say A to P, in the first set of data may be used to create the second set of data having corresponding smoothed data points A' to P'. The noise in the first set of data (and hence an inferred level of contamination) may then be obtained by summing the squares of A-A' to P-P'. These methods can then be used to estimate the effect that contamination is having on the sensitivity of the spectrometer. The spectrometer can then output (e.g. display) advice to the operator with respect to maintenance, e.g. that is it necessary to clean electrodes such as the ion optics and/or run diagnostics etc. FIGS. 6-8 show how the data can be used to determine the cleanliness of the ion optics.

Figure 6C:
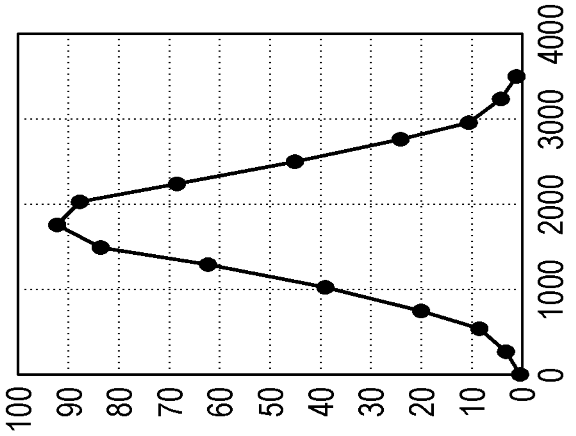
FIG. 6C shows a second set of data that corresponds to the first set of data, except after having been smoothed.
Figure 6B:
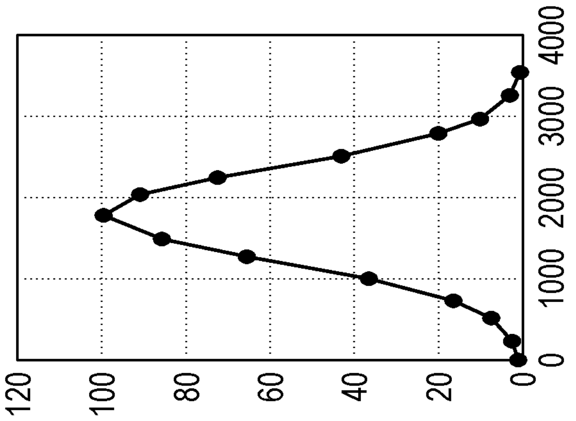
FIG. 6B shows a first set of data representing the sampled ion current when the spectrometer detects ions with a constant sensitivity.
Figure 6A:
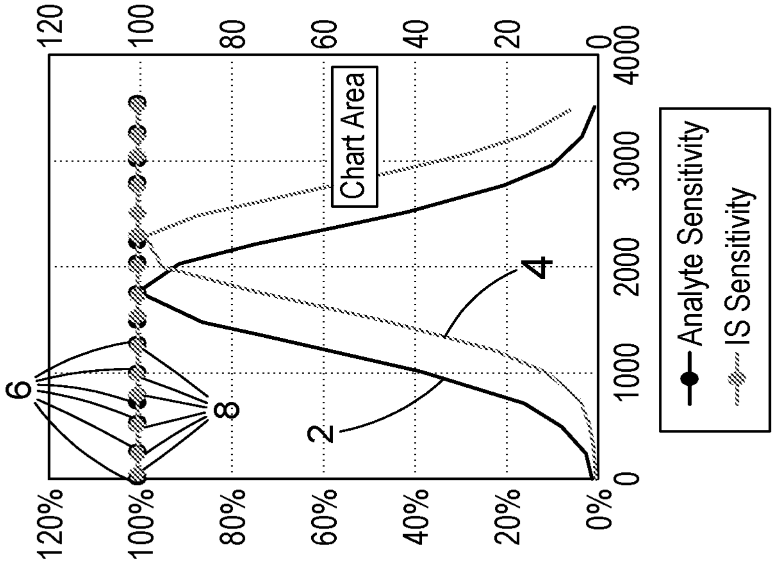
FIG. 6A shows the ion current as a function of time for an ion peak and also the sampling times of that ion peak.

FIG. 6A shows the ion current 2 as a function of time for the peak of an ion derived from an analyte of interest A, and also a peak 4 for an ion I derived from its corresponding internal standard. The ion current is represented by the vertical scale on the right. The ion current 2 from ion A is sampled a plurality of times by the spectrometer during its peak, as shown by circles 6. The ion current 4 from ion I is also sampled a plurality of times by the spectrometer during its peak, as shown by circles 8. In this example, it is assumed that the spectrometer sensitivity remains constant at 100% for the entire duration of the peaks. The sensitivity is represented by the vertical scale on the left. FIG. 6B shows a first set of data representing the ion current 2 sampled by the spectrometer as a function of time for ion A, where the circles represent the current values sampled and the lines between are interpolations. FIG. 6C shows a second set of data that corresponds to the first set of data, except after having been smoothed. As can be seen from FIGS. 6B and 6C, the first and second sets of data have very similar signal profile shapes and areas.

Figure 7C:
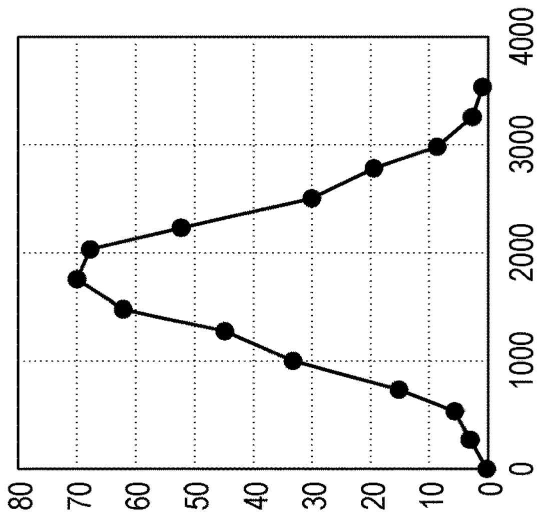
FIGS. 7A to 7C correspond to FIGS. 6A to 6C, respectively, except that the spectrometer sensitivity does not remain constant at 100% but varies with time instead.
Figure 7B:
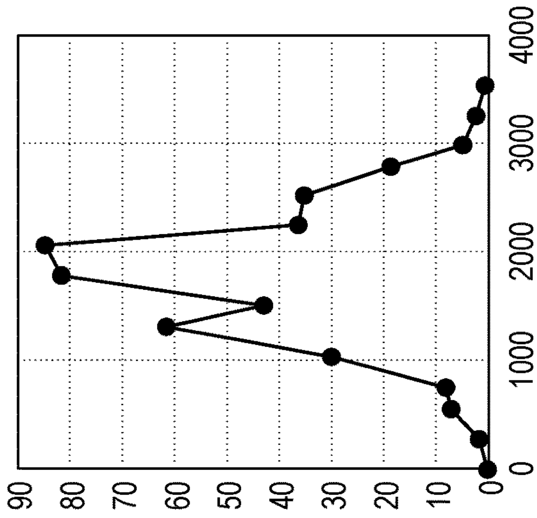
Figure 7A:
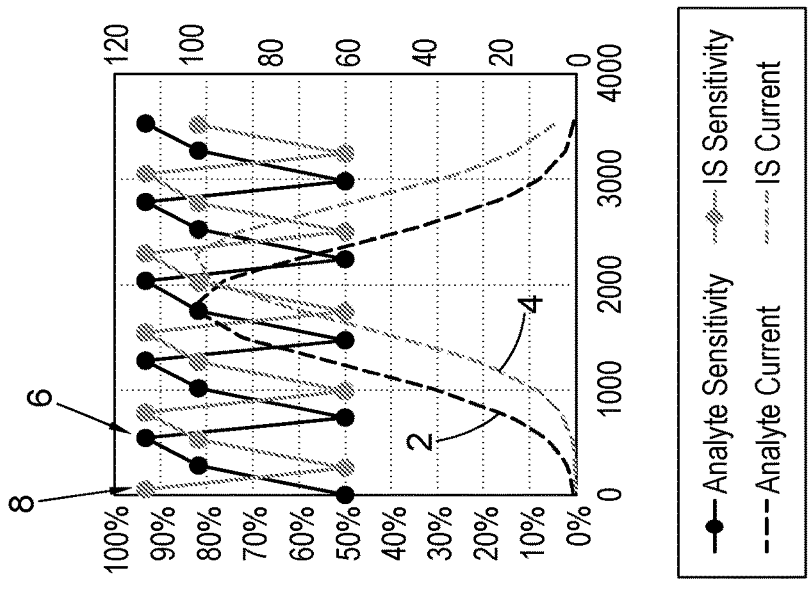

FIG. 7A corresponds to FIG. 6A, except that the spectrometer sensitivity does not remain constant at 100% for the entire duration of the peaks but varies as shown in FIG. 4. Therefore, the spectrometer sensitivity is 50% when the ion signal for ion A is first sampled, 82% when sampled for a second time and 93% when sampled for a third time. This pattern is then repeated as shown in FIG. 4. Similarly, the spectrometer sensitivity is 93% when the ion signal for ion I is first sampled, 50% when sampled for a second time and 82% when sampled for a third time. This pattern is then repeated as shown in FIG. 4. FIG. 7B shows a first set of data representing the ion current detected by the spectrometer as a function of time for ion A, where the circles represent the current values detected and the lines between are interpolations. As can be seen by comparing FIGS. 7A and 7B, the detected signal for ion A is significantly degraded due to the sensitivity of the spectrometer varying over the timescale of the peak for ion A. This indicates that the ion optics of the spectrometer are contaminated, because if there was no (or insignificant) contamination then in this embodiment the sensitivity of the spectrometer would not be significantly affected when the polarity of the voltages applied thereto is changed. The profile of the first set of data shown in FIG. 7B would typically present a problem to the software that identifies peaks and calculates their area, because it implies that multiple peaks from multiple different ions have been detected, rather than from a single ion. The first data is therefore smoothed (e.g. using a boxcar algorithm) so as to form a second set of data as shown in FIG. 7C. As can be seen from FIGS. 7B and 7C, the first and second sets of data have different signal profiles (e.g. different shapes). It is therefore apparent that these signals (e.g. profile/shape) can be compared in order to determine if there is contamination of the ion optics.

Figure 8C:
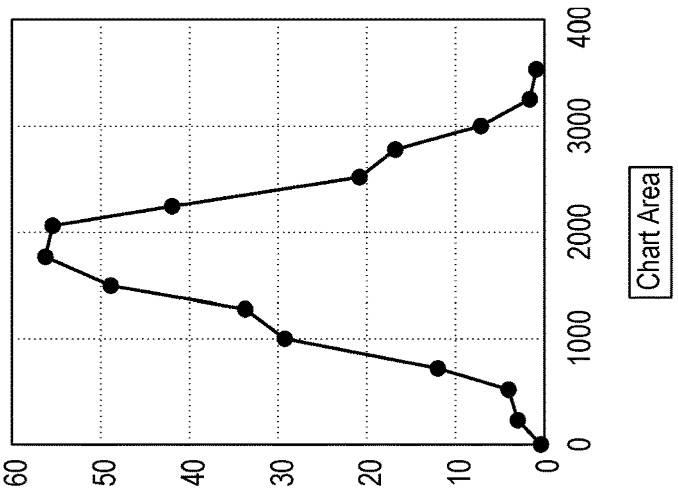
FIGS. 8A to 8C correspond to FIGS. 7A to 7C, respectively, except that the spectrometer sensitivity varies with time by a greater amount.
Figure 8B:
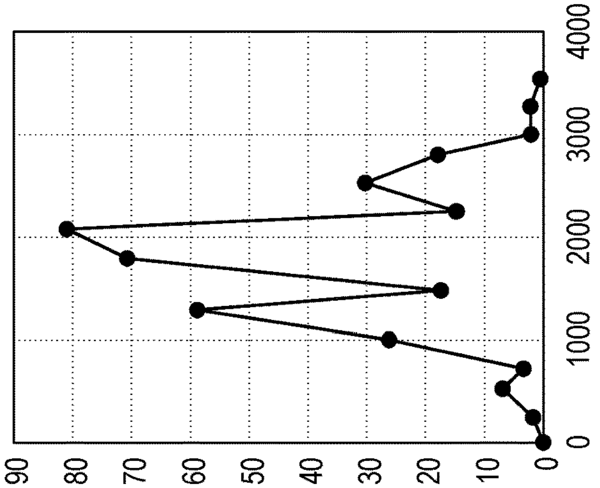
Figure 8A:
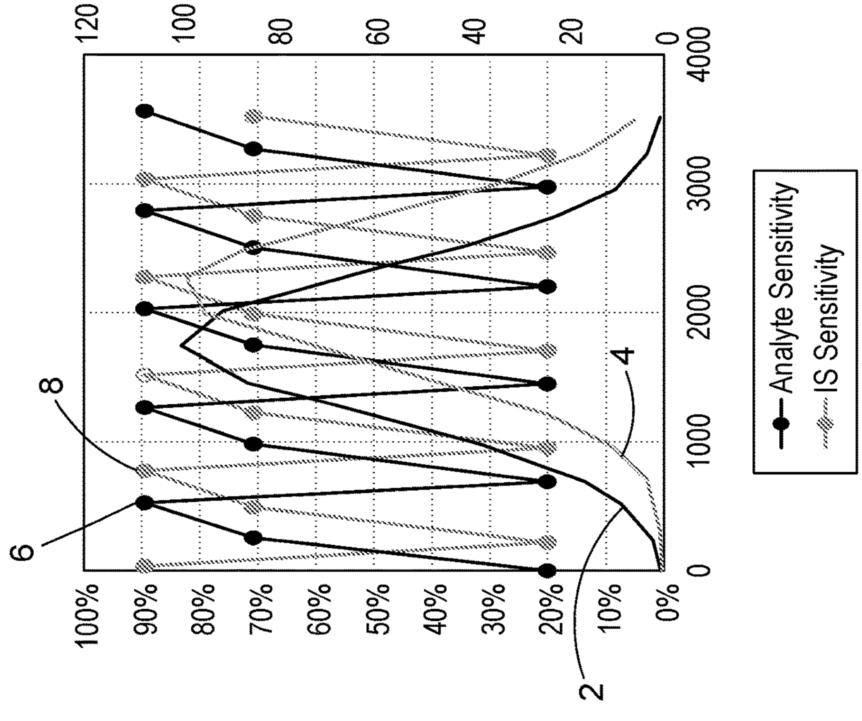

FIG. 8A corresponds to FIG. 7A, except that the spectrometer sensitivity varies between different values. More specifically, the spectrometer sensitivity is 20% when the ion signal for ion A is first sampled, 70% when sampled for a second time and 90% when sampled for a third time. This pattern is then repeated. Similarly, the spectrometer sensitivity is 90% when the ion signal for ion I is first sampled, 20% when sampled for a second time and 70% when sampled for a third time. This pattern is then repeated. FIG. 8B shows a first set of data representing the ion current detected by the spectrometer as a function of time for ion A, where the circles represent the current values detected and the lines between are interpolations. As can be seen by comparing FIGS. 8A and 8B, the detected signal for ion A is very significantly degraded due to the sensitivity of the spectrometer varying over the timescale of the peak for ion A, and more degraded than in FIG. 7B. This indicates that the ion optics of the spectrometer are more contaminated than in the experiment of FIG. 7B. FIG. 8C shows a second set of data that corresponds to the first set of data in FIG. 8B, except after having been smoothed. As can be seen from FIGS. 8B and 8C, the first and second sets of data have very different signal profiles. It is therefore apparent that these signals can be compared in order to determine if there is contamination of the ion optics and the level of contamination.

Although FIGS. 6B, 6C, 7B, 7C, 8B and 8C only show data for the ion A, it will be appreciated that sampling the signal for ion I at the times shown in FIGS. 6A, 7A and 8A would produce corresponding data for ion I.

Although the method has been described as analysing only three types of ions for each analyte of interest (i.e. ions A, ions I and ions C), it is also contemplated that one or more further type of ion may be analysed for each analyte of interest. For example, a second confirmatory ion S may be analysed by setting the second mass filter so as to only transmit ions having a mass to charge ratio corresponding to the second confirmatory ion. It is also contemplated that the method could be applied where only two species of ions are analysed, e.g. ions A and one related species of ion, or a pair of different analytes, or one analyte A and one internal standard I, or one analyte A and one if its fragment ion.

As described above, a plurality of MRM transitions are sampled each time an analyte of interest is monitored. The order in which those MRM transitions are sampled is varied so as to be different for different times that the analyte of interest is monitored. It will be appreciated that the order can be varied in a variety of ways.

The order in which the MRM transitions are sampled may be changed every time that the analyte of interest is analysed, for a plurality of consecutive times that the analyte of interest is analysed, so as to form a sequence of analysis. This sequence may then be repeated one or more times for the consecutive times that the analyte of interest is analysed. The sequence may be repeated an integer number of times over the analyte peak, or a non-integer number of times (i.e. the analyte of interest may only be present for a period of time such that it gives a signal over an incomplete number of cycles).

It may be desirable to select the order of the transitions sampled in the sequence so as to provide the most constant sampling rate (lowest maximum jitter) possible, e.g. as will be described in relation to FIGS. 9 and 10.

Figure 9C:
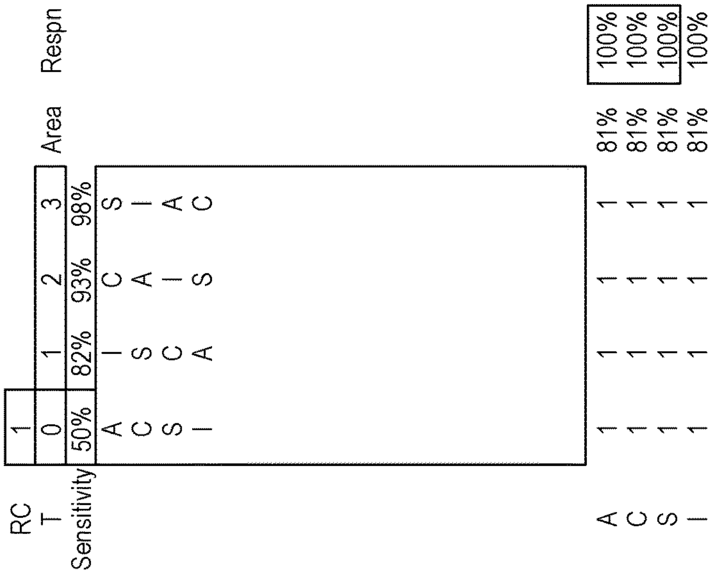
FIG. 9C shows a pattern of analysis according to another embodiment of the invention which results in reduced jitter.
Figure 9B:
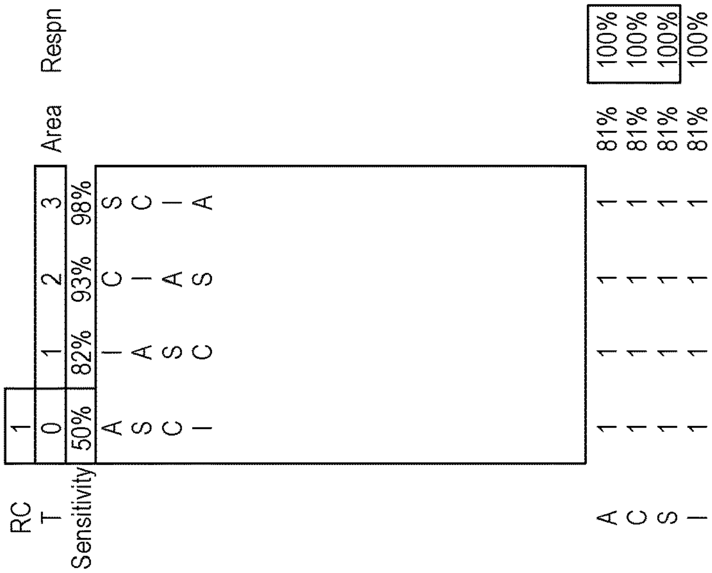
FIG. 9B shows a pattern of analysis according to an embodiment of the invention which does result in jitter.
Figure 9A:
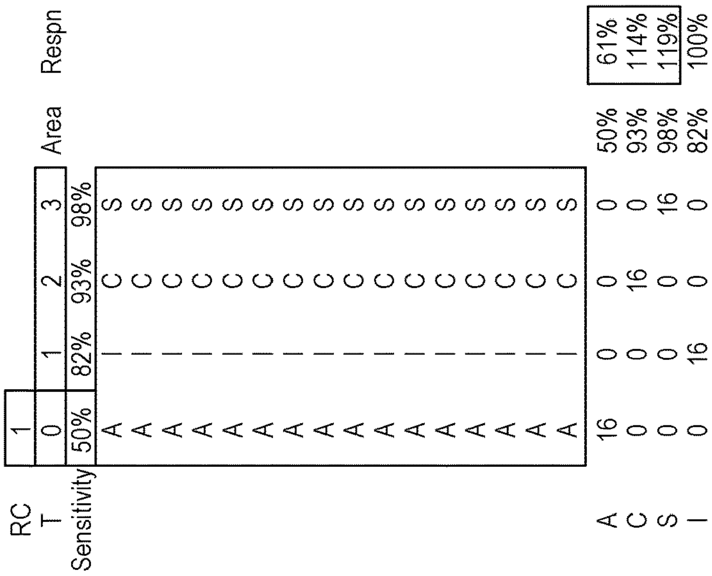
FIG. 9A shows the conventional pattern of analysis that results in no signal jitter.

FIG. 9A shows the conventional pattern of analysis, which corresponds to that of FIG. 3 except that secondary confirmation ions S are also sampled each time the analyte of interest is analysed. This conventional technique does not suffer from the jitter described above, because the MRM transitions are sampled in the same order each time the analyte is analysed. Therefore, the sampling interval is constant for any given one of the ions A, I, C, S. However, this conventional technique suffers which the above-described problems caused by contamination of the ion optics and so the Responses of the ions A, I, C, S differ significantly.

FIG. 9B shows a pattern of analysis according to an embodiment of the invention, in which the order of the transitions sampled is varied each time the analyte of interest is analysed. In this embodiment, each time the analyte is analysed, the order in which the transitions are sampled is the same as the immediately preceding time the analyte was analysed, except that the final transition sampled in the preceding analysis is made the first transition sampled. Although the Responses of the ions A, I, C, S are the same, which is advantageous, the jitter is very high because the same type of ion is sampled twice consecutively (i.e. at the end of each row and the start of the next row).

FIG. 9C shows a pattern of analysis according to an embodiment of the invention, in which the order of the transitions sampled is varied each time the analyte of interest is analysed, but in a manner so as to reduce jitter. The order of the transitions sampled is selected such that the same type of ion is not sampled in consecutive samples. In the particular embodiment shown, the order that the transitions are sampled in for the second time the analyte is analysed (second row) is the same as the first time (first row), except that the penultimate and final transitions sampled in the first row have been made the first and second transitions sampled in the second row, respectively. The order that the transitions are sampled in for the third time the analyte is analysed (third row) is the reverse of the first time (first row). The order that the transitions are sampled in for the fourth time the analyte is analysed (fourth row) is the same as the third time (third row), except that the penultimate and final transitions sampled in the third row have been made the first and second transitions sampled in the fourth row, respectively.

Figures 10A, 10B, 10C:
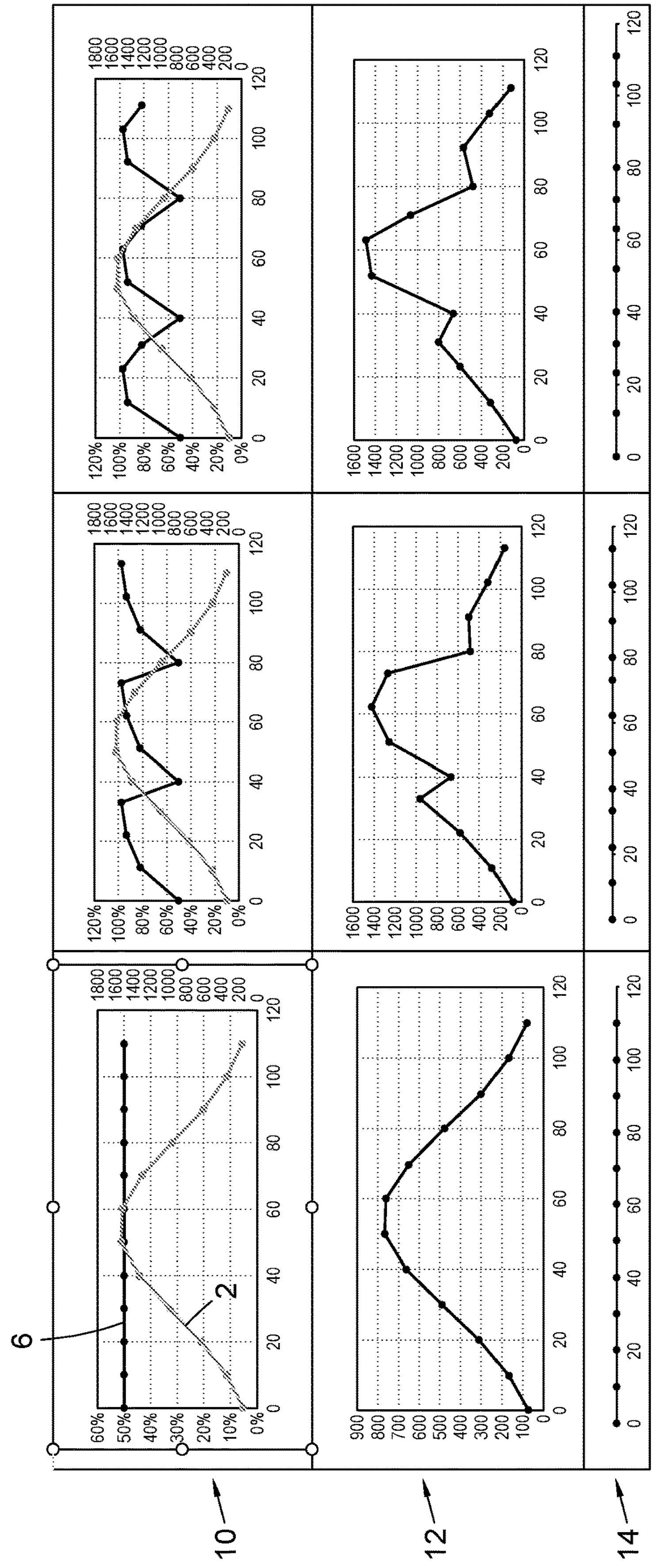
FIGS. 10A to 10C show the effect of the different instrument sensitivities on the sampled signal and the amount of jitter according to various techniques.

The upper plot 10 in FIG. 10A shows the ion current intensity (right vertical scale) as a function of time for the peak 2 of an ion derived from an analyte of interest A, and also the spectrometer sensitivity 6 (left vertical scale), which remains constant at 50% for the entire duration of the peak. The ion current from ion A is sampled a plurality of times by the spectrometer during its peak, as shown by circles in the vertically central plot 12 of FIG. 10A. As can be seen, due to the sensitivity of the spectrometer being 50%, the detected intensity is reduced. This example illustrates the conventional approach (e.g. as illustrated by FIG. 9A) in which the ions A are sampled at a constant rate, as shown in the bottom plot 14 in FIG. 10A.

The upper plot 10 in FIG. 10B shows the same ion current for ion A as is shown in FIG. 10A. However, the ion current is sampled according to the embodiment shown in FIG. 9B. Therefore, the sensitivity of the spectrometer varies with time as the ion current is sampled, as shown in the central plot 12 in FIG. 10B. The sensitivity is 50% at the first sampling time, 82% at the second sampling time, 93% at the third sampling time and then 98% at the fourth sampling time. Once this sequence is completed the spectrometer cycles back and repeats the sequence a plurality of times. Due to the sensitivity of the spectrometer varying, the detected intensity varies as a product of the sensitivity and the ion current, at any given sampling time, as shown by the central plot 12 in FIG. 10B. As described above with respect to FIG. 9B, this embodiment leads to relatively high jitter, as shown in the bottom plot 14 in FIG. 10B.

The upper plot 10 in FIG. 10C shows the same ion current for ion A as is shown in FIGS. 10A and 10B. However, the ion current is sampled according to the embodiment shown in FIG. 9C. Therefore, the sensitivity of the spectrometer varies with time as the ion current is sampled, as shown in the central plot 12 in FIG. 10C. The sensitivity is 50% at the first sampling time, 93% at the second sampling time, 98% at the third sampling time and then 82% at the fourth sampling time. Once this sequence is completed the spectrometer cycles back and repeats the sequence a plurality of times. Due to the sensitivity of the spectrometer varying, the detected intensity varies as a product of the sensitivity and the ion current, at any given sampling time, as shown by the central plot 12 in FIG. 10C. As described above with respect to FIG. 9C, this embodiment leads to relatively low jitter, as shown in the bottom plot 14 in FIG. 10C.

Alternatively, or additionally, it may be desirable to select the order of the transitions sampled in the sequence so as to reduce the difference between the responses of the different transitions being sampled when a non-integer number of sequences is used in the analysis of an analyte of interest. For example, having a long sequence can increase the impact on response accuracy when a non-integer number of sequences occurs across the peak for the analyte of interest. FIGS. 11A-11D illustrate an example of this.

Figure 11A:
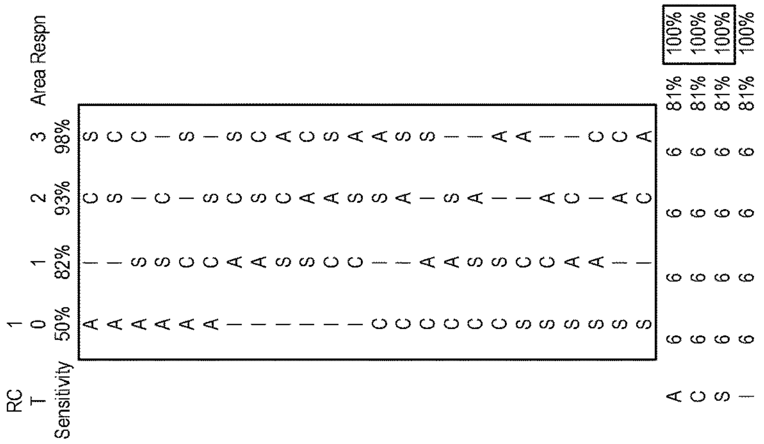
FIGS. 11A to 11D shows the effects on the ion signal Responses (relative sensitivities) for different sampling patterns and lengths.
Figure 11B:
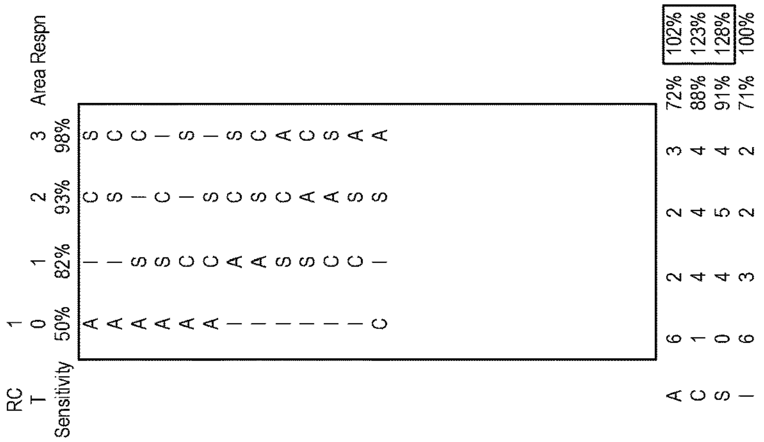

FIG. 11A shows an example in which the order in which the MRM transitions are sampled is changed every time that the analyte of interest is analysed for 24 consecutive times, i.e. the sequence is 24 rows of the table. When the entire sequence is performed, the Response is 100% for each of the ions A, C, S, I. However, if only part of the sequence is performed then the Reponses for the ions differ, as shown in the example of FIG. 11B in which only 13 rows of the sequence are performed.

Figure 11C:
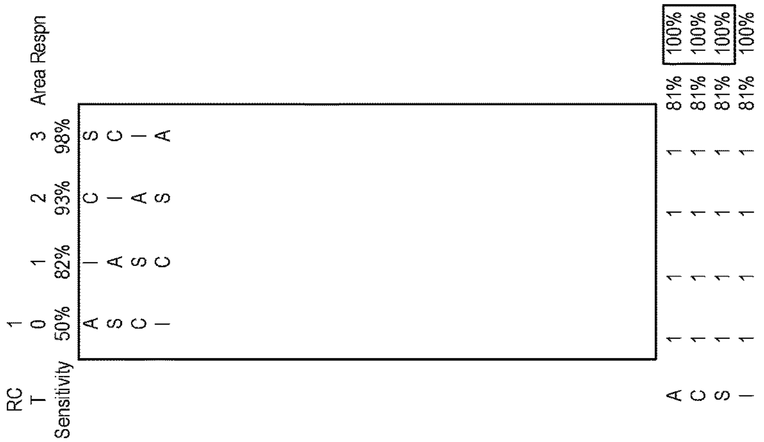
Figure 11D:
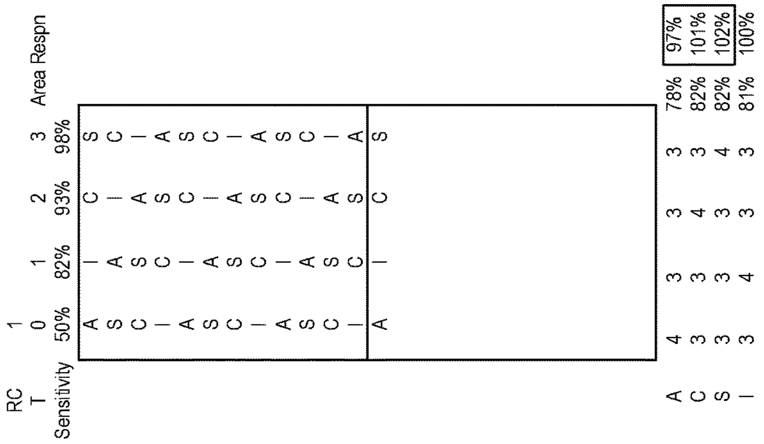

In contrast, FIG. 11C shows an example in which the order in which the MRM transitions are sampled is changed every time that the analyte of interest is analysed for 4 consecutive times, i.e. the sequence is 4 rows of the table. When the entire sequence is performed, the Response is 100% for each of the ions A, C, S, I. As above, if only part of the sequence is performed (i.e. a non-integer number of sequences is performed) then the Reponses for the ions differ, as shown in the example of FIG. 11D in which the sequence is performed 3.25 times. It can be seen by comparing FIGS. 11B and 11D that using the shorter sequence has less of an adverse effect on the Responses (i.e. the Responses are less different) when a non-integer number of sequences are performed.

Alternatively, or additionally, it may be desirable to select the order of the transitions sampled in the sequence depending on the algorithm used to detect the cleanliness of the ion optics using the method described in relation to FIGS. 7 and 8.

Ideally, for accurate reconstruction of a peak, the sampling times at which any given ion A, C, I, S is sampled should be evenly spaced apart when sampling across its peak, e.g. as shown in the bottom plot 14 in FIG. 10A. The spacing of these sampling times depends on how many transitions are to be analysed for each analyte of interest, and also on the number of analytes of interest that are being simultaneously monitored (i.e. that may co-elute). For example, if more transitions and/or analytes are being monitored then the sampling times for any given ion will be spaced further apart in time. These evenly spaced sampling times may be considered as nominal sampling times. However, according to embodiments of the invention, the order in which the ions A, C, I, S are sampled is varied during the experiment and therefore the times at which any given one of these ions is sampled is not evenly spaced. The percentage jitter of the sampling time from the nominal sampling time will depend primarily on the number of analytes of interest being simultaneously monitored (i.e. that co-elute) and, to a smaller extent, also on the number of transitions per analyte of interest.

Figure 12A:
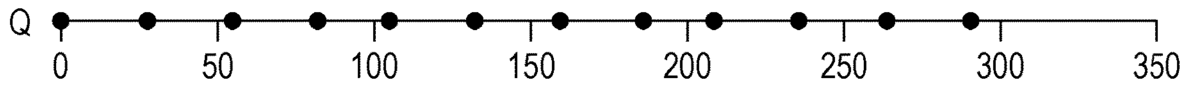
FIGS. 12A to 12C show the sampling times according to different techniques.
Figure 12B:
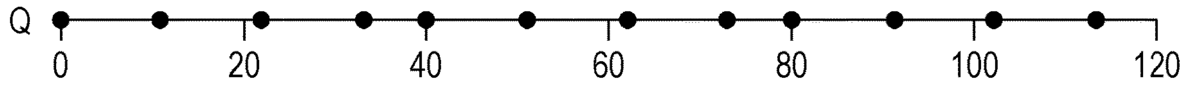
Figure 12C:
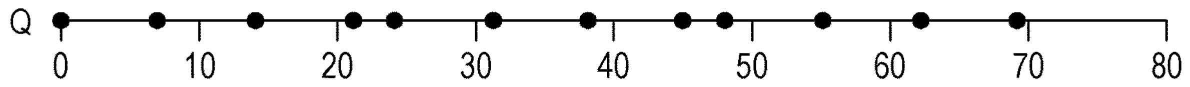

FIGS. 12A-12C show plots of the sampling intervals of the internal standard for analyses in which different numbers of analytes of interest are simultaneously monitored, wherein four transitions (i.e. four types of ions) are monitored for each analyte of interest (i.e. ions A, C, I, S). FIG. 12A shows a plot of the sampling times when six analytes of interest are being monitored simultaneously, FIG. 12B shows a plot of the sampling times when four analytes of interest are being monitored simultaneously, and FIG. 12C shows a plot of the sampling times when two analytes of interest are being monitored simultaneously. It can be seen by comparing FIGS. 12A-12C that the jitter is less apparent as more analytes of interest are monitored simultaneously. This is because the increased number of analytes being monitored causes the sampling times for any given one of the analytes to be spaced further apart. The change in the sampling time relative to the nominal value, caused by the jitter, is relatively small compared to the increased spacing of the sampling times and is therefore less apparent.

In order to minimize the effect of the jitter when reconstructing the peak for the ion being analysed, the peak integration software can use the actual sampling times, rather than using the nominal sampling times. Alternatively, or additionally, the amount of distortion can be reduced by increasing the rate at which the transitions are switched between (i.e. monitoring a greater number of transitions per second) as the number of analytes "simultaneously" being monitored decreases.

Embodiments of the invention improve quantitation accuracy even when a calibration curve is used, as the acquisitions that formed the calibration curve may not have the same abundance of ions as the sample acquisitions. This means that the charging/discharging of any contaminated ion optical elements will not be the same for the calibration curve acquisitions and sample acquisitions. Also it may be that the instrument contamination level has changed since the calibration curve data was acquired.

Although embodiments have been described in which the order of the transitions is changed each time the analyte of interest is monitored, it is recognised that this causes jitter and other effects such as increasing the time between the analysis of ion A and ions I, or causing the analysis of both to happen later. Embodiments are therefore contemplated in which the order in which the ions A, C, I, S are monitored may remain constant for a plurality of consecutive times that the analyte of interest is monitored, and that the order may be varied in another part of the acquisition. For example, in embodiments that use a chromatography device to separate the sample, only a particular range of compounds can elute at any one time. The spectrometer may therefore only sample MRM transitions for an analyte of interest over the time at which it is possible for that analyte of interest to elute. This leads to the MRM transitions that the spectrometer monitors for changing over the elution time. In the example shown in FIG. 1, only the ZEA transitions are monitored for after switching to negative ion electrospray mode. Therefore, an embodiment may only vary the order in which the transitions are monitored during the time region that includes analysing ZEA, whereas when only the other analytes of interest are being monitored the order of the transitions may remain constant.

It is also contemplated that whilst only a single analyte of interest elutes, the spectrometer may automatically switch (e.g. by detecting this) so that order of transitions being monitored remains constant, thereby avoiding any jitter related quantitation inaccuracy.

Embodiments are also contemplated in which a single internal standard is used for multiple analytes of interest. The method may monitor the internal standard transition each time that it analyses each of the multiple analytes that share that internal standard. Alternatively, the transitions for said multiple analytes could be grouped, along with the transition for their common internal standard, so as to form a larger sequence that is repeated.

According to embodiments of the present invention, peak detection fidelity may be improved by summing the current from the ions A and the current(s) from one of more of the confirmation ion(s) C and/or S when determining the start and end of the peak during the peak area measurement method.

Although the present invention has been described with reference to various embodiments, it will be understood by those skilled in the art that various changes in form and detail may be made without departing from the scope of the invention as set forth in the accompanying claims.

For example, although the contamination of ion optics such as ion guides and mass filters has been described, it is contemplated that the problem may arise with contamination of other electrodes in the spectrometer, such as in a collision cell for fragmenting or cooling ions.

Although embodiments have been described herein that reduce measurement bias in the event of a polarity switch, the invention is not limited to this and relates to other events that cause a (reproducible) change in the sensitivity able to be detected. Such events may be caused by, for example, circuit response lag times, ion guide charging, mass switching and other events. Alternatively, or additionally, a variation in sensitivity of the spectrometer may be caused by a change in another variable, such as being caused by the components of the sample being analysed varying with time. For example, the sample may be separated by chromatography and ionised prior to analysis, and a relatively highly concentrated component may elute from the separation device and be ionised so as to produce a relatively intense ion signal. This intense ion signal may cause the sensitivity of the spectrometer to vary with time, e.g. by the intense ions causing surface charging of electrodes within the spectrometer or by another effect that changes sensitivity.

Similarly, although embodiments have been described comprising a tandem quadrupole mass spectrometer, the invention is not limited to such instruments but instead applies to all types of instrument that suffer from time varying sensitivities.

According to a less preferred embodiment, rather than alternating the order in which ions A, C and I are analysed so as to occur in different orders after different polarity changes, the different ions may be analysed in the same order after every polarity change, but a greater number of times per second. This will reduce the change in sensitivity between each MRM transition being monitored, but is not preferred for three reasons. Firstly, it is still not balancing low and high sensitivity between, for example, an analyte and its internal standard. Consequently, this method reduces the effect of contamination less effectively than the other methods described herein. Secondly, between each MRM transition there is a short period where no data should be acquired whilst the electronics/optics are given time to settle. Since this method monitors a greater number of transitions per second, a greater total time will be needed for the electronics/optics to settle and so this limits the time spent detecting the ions and so sensitivity will be lost (i.e. the duty cycle is worse). Thirdly, it will be less easy to determine a figure of merit for contamination.

The invention claimed is:

1. A method of mass analysing a single analytical sample comprising:

i) transmitting different species of ions through a mass spectrometer; and ii) sequentially mass analysing, or otherwise detecting, said different species of ions in a particular sequential order;

wherein steps i) and ii) are performed more than two times, and wherein the sequential order in which said different species of ions are mass analysed, or otherwise detected, is different each of the more than two times step ii) is performed.

2. The method of claim 1, wherein the sensitivity with which the mass spectrometer is able to detect ions varies for a period of time, and wherein step ii) and iii) are performed during said period of time.

3. The method of claim 2, comprising varying the operation of the mass spectrometer in a manner that causes the sensitivity with which the spectrometer is able to detect ions to vary for said period of time.

4. The method of claim 3, wherein said step of varying the operation of the mass spectrometer comprises switching the voltage applied to at least one electrode of the mass spectrometer that controls the transmission of ions therethrough to a different voltage; and wherein step i) comprises subsequently transmitting said different species of ions through the spectrometer and passed said at least one of said electrodes.

5. The method of claim 4, wherein said step of varying the operation of the mass spectrometer comprises switching the polarity of the voltage to a different polarity.

6. The method of claim 5, wherein the step of varying the operation of the mass spectrometer comprises alternating the mass spectrometer between a first mode of operation in which it generates and transmits positive ions and a second mode of operation in which it generates and transmits negative ions, and/or vice versa.

7. The method of claim 1, wherein each time step ii) is performed, it comprises mass filtering said different species of ions using a mass filter such that only a single species of ion is transmitted to an ion detector at any one time, and wherein the mass filter is controlled so as to change the species of ion that is transmitted to the detector at different times, thereby defining said sequential order in which the different species of ions are mass analysed.

8. The method of claim 7, wherein a first time that step ii) is performed, the mass filter transmits only a first of said different species of ions to the detector at a first time, and subsequently transmits only a second of the different species of ions to the detector at a second, subsequent time; and wherein a subsequent time that step ii) is performed, the mass filter transmits only the second of said different species of ions to the detector at one time, and subsequently transmits only the first of the different species of ions to the detector at a later time.

9. The method of claim 1, comprising comparing the ion signal detected for one of said different species of ions with the ion signal detected for another of said different species of ions.

10. The method of claim 1, wherein the spectrometer comprises a user interface and, prior to step ii), the method comprises selecting the species of ions that are to be said different species of ions and inputting these selected species of ions into the user interface so that the mass spectrometer performs steps ii) and iii) on these ions.

11. The method of claim 1, wherein all of the steps are performed within a single experimental run.

12. The method of claim 1, comprising separating a sample that comprises a plurality of different analytes of interest using a chromatography device such that said different analytes of interest elute from the chromatography device over different respective time periods, and ionising the sample eluting from the chromatography device so as to provide ions of said analytes of interest.

13. The method of claim 12, wherein steps i) to iii) are performed during each time period that each analyte of interest is expected to elute from the chromatograph device.

14. The method of claim 13, comprising performing steps i) to iii) over the period that an analyte of interest elutes from the chromatography device so as to obtain the intensity of the ion signal detected for one of said different species of ions for each time that the steps are performed;

producing a first set of data that comprises the intensity of the ion signal as a function of detection time;

smoothing the first set of data so as to obtain a second set of smoothed data; and determining if maintenance of the spectrometer is required based on a comparison of the first and second sets of data.

15. The method of claim 14, comprising controlling a display screen to indicate that maintenance of the spectrometer is required if the first and second sets of data do not match or differ by a predetermined or threshold amount.

16. The method of claim 1, wherein step iii) comprises performing step ii) in a manner such that the first species of ion mass analysed, or otherwise detected, any given time that step ii) is performed differs from the last species of ion that was mass analysed, or otherwise detected, the preceding time that step ii) was performed.

17. A mass spectrometer comprising:

a mass analyser; and a controller having electronic circuitry configured to control the spectrometer to:

i) transmit different species of ions through the mass spectrometer; and ii) sequentially mass analyse, or otherwise detect, said different species of ions in a particular sequential order;

wherein steps i) and ii) are performed more than two times, and wherein the sequential order in which said different species of ions are mass analysed, or otherwise detected, is different each of the more than two times step ii) is performed.

18. The mass spectrometer of claim 17, comprising a user interface for inputting the species of ions that are to be said different species of ions into the mass spectrometer, and wherein the mass spectrometer is configured to perform steps ii) and iii) on these inputted species of ions.

19. A mass spectrometer comprising:

a separation device for separating ions, or analytes;

a mass analyser; and a controller having electronic circuitry configured to control the mass spectrometer to:

i) operate during a period of time in which the sensitivity with which the mass analyser is able to detect ions varies;

ii) determine the intensity of the ion signal of an ion of interest detected by the mass analyser within said period of time;

iii) repeat steps i) and ii) as the ion of interest, or an analyte from which it is derived, elutes from the separation device; wherein when step ii) is repeated, it is performed at different times after said period of time begins;

iv) produce a first set of data that comprises the intensity of the ion signal as a function of detection time using the intensity of the ion signals determined each time step (ii) is performed;

v) smooth the first set of data so as to obtain a second set of smoothed data; and vi) determine if maintenance of the spectrometer is required based on a comparison of the first and second sets of data.

20. The mass spectrometer of claim 19, wherein the controller is configured to determine if there is contamination of the spectrometer based on the comparison of the first and second sets of data.

* * * * *